(12) United States Patent
Finlayson et al.

(10) Patent No.: US 8,200,007 B2
(45) Date of Patent: Jun. 12, 2012

(54) ILLUMINANT ESTIMATION

(75) Inventors: Graham Finlayson, Norwich (GB); Elisabetta Trezzi, Norwich (GB)

(73) Assignee: Apple Inc., Cupertino, CA (US)

( * ) Notice: Subject to any disclaimer, the term of this patent is extended or adjusted under 35 U.S.C. 154(b) by 1017 days.

(21) Appl. No.: 11/910,198

(22) PCT Filed: Apr. 3, 2006

(86) PCT No.: PCT/GB2006/001212
§ 371 (c)(1),
(2), (4) Date: May 28, 2008

(87) PCT Pub. No.: WO2006/103469
PCT Pub. Date: Oct. 5, 2006

(65) Prior Publication Data
US 2008/0279450 A1   Nov. 13, 2008

(30) Foreign Application Priority Data

Apr. 1, 2005 (GB) .................................. 0506703.8

(51) Int. Cl.
*G06K 9/00* (2006.01)
(52) U.S. Cl. ........................................ 382/167; 382/162
(58) Field of Classification Search .................. 382/112, 382/162, 167, 274–275, 163; 358/518
See application file for complete search history.

(56) References Cited

U.S. PATENT DOCUMENTS

2005/0226496 A1* 10/2005 Finlayson ..................... 382/162
2006/0110052 A1*  5/2006 Finlayson ..................... 382/232

OTHER PUBLICATIONS

K. Barnard, et al. "A comparison of computational color constancy algorithms; part two: Experiments with image data," IEEE Transactions on Image Processing, 11(9):985-996, 2002.
V. Cardei, et al. "Learning color constancy," In 4th IS&T and SID Color Imaging Conference, 1996.
G.D. Finlayson. "Color in perspective," IEEE transactions on Pattern analysis and Machine Intelligence, pp. 1034-1038, Oct. 1996.
G.D. Finlayson, et al. "Color constancy under varying illumination," in Proceedings of the fifth International Conference on Computer Vision, pp. 720-725. IEEE Computer Society, Jun. 1995.
G.D. Finlayson, et al. "Colour by correlation: a simple unifying theory of colour constancy." In IEEE international conference on computer vision, pp. 835-842, 1999.
G.D. Finlayson, et al. "Gamut constrained illuminant estimation," Proceedings of the 9th International Conference on Computer Vision, 2, Oct. 2003.
G.D. Finlayson, et al. "Shades of grey and colour constancy," In IS&T and SID's 12th Color Imaging Conference, pp. 37-41, 2004.
David A. Forsyth. "A novel algorithm for color constancy," International Journal of Computer Vision, 5:5-36, 1994.
B.V. Funt, et al. "Is machine colour constancy good enough," In The Fifth European Conference on Computer Vision (vol. II), pp. 445-459. European Vision Society, 1998.

(Continued)

*Primary Examiner* — Duy M Dang
(74) *Attorney, Agent, or Firm* — Fish & Richardson P.C.

(57) ABSTRACT

A method of estimating, illuminant comprises minimizing a Minkowski norm with illuminant constraints. The norm is preferably between 3 and 7 and most preferably between 4 and 6. The method is used to remove the color of an illuminant from an image.

20 Claims, 1 Drawing Sheet

OTHER PUBLICATIONS

Figure 1:
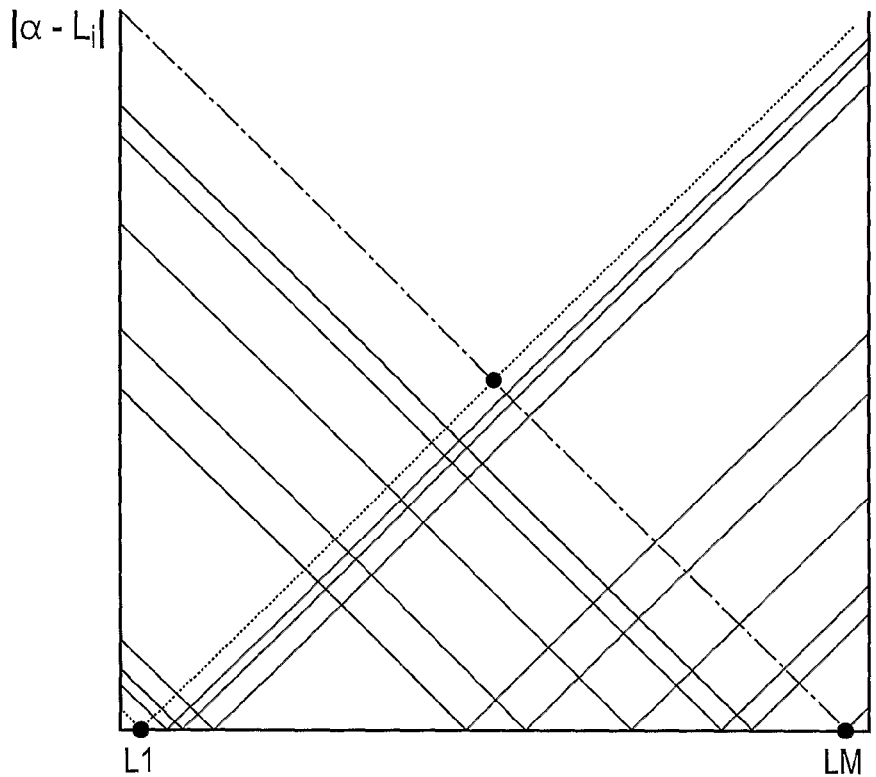

P.M. Hubel, et al. "Matrix calculations for digital photography," In IS&T and SID's 5th Color Imaging Conference, pp. 105-111, 1997.

L.T. Maloney, et al. "Color constancy: a method for recovering surface spectral reflectance," J. Opt. Soc. Am. A, 3:29-33, 1986.

B. Schiele, et al. "Gaze tracking based on facecolor," In International Workshop on Automatic Face- and Gesture-Recognition, Jun. 1995.

"Data for Computer Vision and Computational Colour Science", Computational Vision Lab, School of Computing Science, Simon Fraser University, http://www.cs.sfu.ca/~colour/data/, downloaded Feb. 2, 2012.

Buchsbaum, "A Spatial Processor Model for Object Colour Perception", Journal of the Franklin Institute, 310:1-26, 1980.

Kolmogorov et al., "Introductory Real Analysis", Dover Publications, Inc., 1975.

Land, "The Retinex Theory of Color Vision", Scientific American, vol. 237, No. 6, pp. 108-128, Dec. 1997.

Maloney, "Surface Colour Perception and Environmental Constraints", Colour Perception: Mind and the Physical World, Didier Heyer, Oxford Univ. Press, pp. 279-299, 2003.

Primary Examiner Jean-Pierre Chateau, Communication Pursuant to Article 94(3) EPC mailed Dec. 29, 2011, Application No. 06 726 616.3, 4 pages.

* cited by examiner

ILLUMINANT ESTIMATION

The present invention relates to illuminant estimation, in particular using constrained Minkowski norms.

Colour constancy algorithms attempt to estimate and then remove the colour of the prevailing illuminant. Only when this is done, can image colour be used as a cue for reflectance and so usefully subserve tasks such as tracking and recognition. Broadly speaking, there are two ways to estimate the illuminant. First, we might calculate a simple statistic, such as the mean, from the image and argue that this should correlate with light colour. Second, we incorporate physical knowledge and probabilistic inference to arrive at the estimate. The latter approach results in significantly better performance though, often at significant computational cost.

Aspects of the present invention provide a simple statistical approach which, given knowledge only of the RGBs of typical lights, results in performance close to that delivered by more complex algorithms.

The invention is based on the observation that the two simplest statistical estimators, the mean and max RGB responses, are respectively the $L^1$ and $L^\infty$ norms. We show then that an $L^p$ norm might also be used as an estimator. The theory is then developed to allow a prior constraint to be placed on the illuminant (natural and artificial lights are often bluish, whitish and yellowish but are rarely purple). Experiments on the Simon Fraser Calibrated data set show that the illuminant can be reliably estimated using a constrained $L^4$ norm. Moreover, performance is comparable to the most advanced methods.

Section 1

The colours recorded in an image are a mixture of the colour of objects in a scene and the colour of the light. For example, a white piece of paper when viewed under a blue sky actually reflects a bluish spectrum of light. The reflected spectrum is proportional to the blue incident light multiplied by the white surface and the result of this is itself bluish. Of course, when we look at the world we see a white piece of paper. The fact that we can discount the colour of the light (we are colour constant) is the result of some visual processing where the nature of this processing is as yet unknown. What is known is that our colour constancy is generally quite good: the things we see in the world have more or less the same colour under different coloured lights.

Of course, digital colour cameras are faced with the same problem. The colours a camera records are a function of light and surface, yet we would like only to see surface colour in photographs. Moreover, as observers we are quite fussy about seeing the correct surface colours. So, for example, if the prevailing light is slightly greenish (like some fluorescent lights) and we make a photograph where accordingly faces are slightly greenish, then this is a completely unacceptable reproduction In digital photography it is common to look at the statistics of the image colours to see if the colour bias due to illumination can be estimated. Estimating the colour of the light is the topic of the present invention. Illuminant estimation algorithms fall into two broad camps. There are the simple normalisations and the more advanced statistical theories. As an example of the former we might look at the average colour in the image e.g. the RGB triple formed from the average R, G and B values over all pixels in the image. One might expect that this average will be biased by the colour of the light (indeed it is) and also the average RGB can be (and is) used as a light estimate. As an alternative, we have algorithms which are much more complex and use for example knowledge about the expected statistics of scene composition (and as such can use probabilistic reasoning such as the Bayes Rule. This type of approach is used in U.S. Pat. No. 6,038,339.

This present invention seeks to provide improvements to simple normalisation based methods and systems.

An alternative to the average RGB, the max R, max G and max B image values are often used as an indicator of the colour of the light. Moreover, this estimate often delivers better estimates of the light colour. Embodiments of the present invention involve generalization the notion of mean or max normalisation. The Minkowski norm family (formula given below) calculates a specific sort of weighted mean where the weighting is given by a power term p. When p=1 the Minkowski norm calculates the mean. As p tends to infinity the Minkowski norm calculates the max. For p=2 the norm is the square root of the mean of the squared pixel values (R, G or B). Tests with unconstrained Minkowski norms and based on many standards data sets, demonstrate that the value p=5 delivers better estimation than mean or max illuminant estimation.

Methods according to the present invention show we can calculate Minkowski norms subject to a constraint on what lights we might estimate. The idea here is that we know a priori that there are yellow (Tungsten), white (clouds) and blue (blue sky) lights and, we can record these as camera RGBs. We show below how we can, for a given p, calculate the Minkowski norm that is closest (in a predictable way) to one of a set of precalculated RGBs.

Furthermore, the RGBs that we might use as our definition of the lights can be estimated by measurement (taking pictures of white surfaces under coloured lights) or might be defined (as some reasonable set of colours). The constrained Minkowski norm estimator (for p=5) delivers superior performance to almost all algorithms (except the most computationally expensive counterparts).

Images captured by digital cameras are confounded by the colour of the illumination. Under bluish and yellowish lights the recorded RGBs are respectively bluer and yellower than they ought to be. Estimating and removing colour bias due to illumination is called colour constancy. Solving the colour constancy problem is essential if image colour is to be used as a cue of reflectance. In the absence of colour constancy, colour based trackers and colour recognition systems can fail [16, 11].

Given a correct illuminant estimate, which may be the spectral power distribution of the light or more commonly just the RGB of the illuminant, one can then transform image RGBs to remove colour bias due to illumination [12]. Thus, we will concern ourselves with the estimation part of the colour constancy problem. Illuminant estimation usually works in two stages. First, we summarise the RGB distribution in an image (e.g. we might use the raw distribution of RGBs, a palette of colours [4] or the convex closure of the RGBs [10]) and then we compare this summary statistic to prior knowledge to arrive at an estimate. Indeed, this two stage summary and inference framework, called colour by correlation [7], can account for almost all the major colour constancy algorithms.

While it is, generally, straightforward to build summary colour statistics, the inference step might be more complex. Indeed, the current best performing colour constancy algorithms adopt sophisticated physical constraints and advanced inference to arrive at their estimates. Not only does this increase the computational complexity of the illumination estimation problem, but these algorithms may also require significant device calibration (for example the spectral sensitivities of the camera may need to be known).

In contrast, poorer performing algorithms such as the grey-world and max RGB approaches, which estimate the illuminant as respectively the average and max RGB in the image, make no inference and so the estimation proceeds rapidly. The reason that we can do away with the inference step is that we can argue that images have inherent properties which imply successful estimation. For example, if the average reflectance in an image is grey then the average image colour is the correct estimate of illuminant colour. Max RGB works if there is a white reflectance in the scene. Interestingly, initial experiments led us to the following observation: sometimes the scene average was grey and/or there was a white patch in the scene or sometimes neither assumption held.

In [9], we observed that the mean RGB and max RGB in an image are respectively the $L^1$ and $L^\infty$ norms of the image. It is logical then to ask whether an $L^p$ norm would deliver better performance since, in a simple sense, if p is between 1 and infinity, then the estimate is somewhere between the grey-world and max RGB answers. This in between estimate might, empirically, give better performance. Moreover, we showed that in computing an $L^p$ norm $p \in [1,\infty)$ we are effectively making an assumption about the kind of statistic we might expect to hold in an image (as we vary p we are effectively varying the shade of grey we implicitly assume to present). We showed that an $L^\#$ norm gave good performance (an order of magnitude better than the grey or max RGB algorithm) and better than some of the more advanced algorithms.

Of course we might wonder whether some other norm (not based on the Minkowski family) might give even better performance. However, realistically, there is probably a limit to the performance we can expect from a naive statistical estimator. Therefore in this paper we wish to investigate the $L_p$ approach, where we add a little new information and so have to carry out a small degree of inference. Here we propose that we have some knowledge about the RGBs of typical lights we might encounter in the world. For example, a yellow light is deemed plausible but saturated purple lights never appear in nature or in artificial environments. We then modify the $L_p$ formalism to incorporate this constraint. For the $L_2$ norm, the illuminant constraint means we find the RGB (amongst our illuminant RGB set) which is closest to the image RGBs in a least-squares sense. Similar computations are carried out for other p norms.

We show that calculation of constrained Minkowski norms involves minimising a pth order polynomial. We prove that the particular polynomials that occur must have a unique minima and so these are efficiently found through search.

To evaluate our estimation algorithm we tested the constrained Minkowski norm approach on the Simon Fraser Calibrated image set. We found that our estimation performance for p=4 was equal to or better than most algorithms published to date (even those that carry out substantial expensive inference and require calibration).

In section 2 we present the colour formation equations and the $L_p$ norm approach to illuminant estimation. The constrained Minkowski norm approach is presented in section 3. How to solve the related minimisation problem is explained in section 4. Experiments are reported in section 5. The paper finishes with conclusions in section 6.

Section 2

To understand the illuminant estimation problem we must first consider the process of image formation. We adopt a simple Lambertian model. In this model a surface with reflectance $S(\lambda)$ (where $\lambda$ is wavelength) illuminated by a spectral power distribution $E(\lambda)$ reflects the colour signal $C(\lambda)$ $$C(\lambda)=E(\lambda)S(\lambda) \quad (1)$$

A digital colour camera typically samples the incoming signal with three different classes of sensors (red, green and blue), so that the response by the sensor (R, G, B) is equal to the integral over the visible spectrum w of its sensitivity function $(R(\lambda), G(\lambda), B(\lambda))$ multiplied by the incoming signal:

$$R=\int_w E(\lambda)S(\lambda)R(\lambda)d\lambda, \quad (2)$$

$$G=\int_w E(\lambda)S(\lambda)G(\lambda)d\lambda, \quad (3)$$

$$B=\int_w E(\lambda)S(\lambda)B(\lambda)d\lambda. \quad 4)$$

In colour constancy we attempt to calculate $E(\lambda)$ given only image RGB's. Or, as an easier alternative, to estimate the 3-dimensional vector $[R_E G_E B_E]^T$ corresponding to the RGB of the prevailing light. Subsequently the recorded image is corrected to discount the estimated illuminant. If the illuminant is estimated correctly then the colour cast due to the illuminant is readily removed from images [12]. In contrast, estimating the unknown light colour has been proved to be a very difficult problem.

Over many years several authors have proposed computational theories and algorithms for colour constancy. All algorithms make some sort of prior assumption about the expected state of the world. For example Land [14] implicity assumes that every image contains a white patch (or an effective white is present if bright yellow and blue surfaces are both present: yellow+blue=white) and so the maximum R, G and B responses are a good estimate of the light source RGB. In a similar way, Buchsbaum [3] proposes that the average reflectance of all surfaces in a scene is achromatic. This idea is sometimes called grey-world and an implication of which is that the average RGB in an image can be used as the illuminant RGB. Perhaps the assumption leading to the most elegant algorithm was made by Maloney and Wandell [15] who assumed the RGBs in an image fell on a plane and the orientation of this plane depended uniquely on illuminant colour. Unfortunately, unlike grey world and max RGB, which often work reasonably well, this approach almost always failed [6].

More advanced approaches make more complex assumptions and this in turn leads to more complex algorithms. Forsyth [10], Finlayson [5] and Barnard et al [2] require image RGBs under a reference light to fall within a convex gamut. Illuminant estimation in this framework involves finding the mappings that take the gamut of image colours to the reference lighting conditions. This gamut mapping computation involves the intersection of many 3d convex sets and so is computationally non-trivial. Finlayson et al developed the colour by correlation framework for solving for colour constancy. Here the RGBs in an image are summarised (e.g. a binary histogram is made) and then this summary is compared, or correlated with, a calibration table. This second step constitutes the inference needed to arrive at an illuminant estimate. While substantial effort and calibration is required to build the correlation table for the gamut mapping (and probabilistic and voting approaches) the calibration table for max RGB and grey-world can be written in closed form (indicating that no calibration is needed). Indeed, of all the commonly used algorithms the grey world and max RGB approaches are the only ones which require zero inference and zero calibration.

Recently a new simple statistical approach was proposed. We observed that the mean and max RGBs in an image are the extreme examples of the Minkowski family norm. We proposed, based on intuition and theoretical argument that the Minkowski norm $L^p$ (p∈2[1, infinity)) might also be a reasonable estimate of the illuminant.

Let us recall the definition of the Minkowski norm in an M dimensional real space. Let $\underline{X}=[X_1 \ldots X_M]^T$ a vector in $R^M$. For every $p \geq 1$ the quantity $$\|\underline{X}\|_p = \left\{ \sum_{i=1}^{M} |X_i|^p \right\}^{1/p} \quad (5)$$

defines a norm on $R^M$ [13].

It follows that depending on the chosen p, there is a different definition of the distance between two points, or the length of the vector X. It is useful to consider the relationship between these norms for different p. It is easy to show that $\|\underline{X}\|_q \leq \|\underline{X}\|_p$ for every $p \leq q$, and so the sequence $\alpha_n = \|\underline{X}\|_n$ is monotonically decreasing. The limit is also a norm, called norm infinity and is equal to the maximum of the coordinates:

$$\|\underline{X}\|_\infty := \lim_{n \to \infty} \alpha_n = \max_{i \leq M} |X_i|. \quad (6)$$

We point out that the Minkowski norm is decreasing because this is not what we intuitively expect (we expect $L^\infty$ to be larger than $L^1$). The discrepancy is explained because we have not normalized the norm by the number of samples as is common to do so in computing statistical moments. It is immediate that the following quantity also defines a norm in $R^M$ for every p:

$$\mu_p(\underline{X}) = \frac{\|\underline{X}\|_p}{M^{1/p}}. \quad (7)$$

Importantly, here the norm is monotonically increasing with p. In [9] we show that the $L^{\neq}$ norm delivers significantly better performance than $L^1$ or $L^\infty$ (i.e. than grey-world or max RGB). Indeed we found performance to be close to but not quite as good as the more advanced algorithms. We now seek to extend the basic theory to incorporate a weak constraint on the illuminant colour to arrive at an (almost) calibration and inference free algorithm which delivers performance similar to the more advanced approaches.

According to a first aspect of the present invention there is provided a method of estimating illuminant comprising the step of minimising a constrained Minkowski norm.

In embodiments of the invention, the constraint is an illuminant constraint, in particular, a constraint on the possible illuminant colours, e.g. a set of N, RGBs. For example if we had a constraint set of 3 there would be 3 RGBs in the constraint set. Effectively, as explained below, we solve for the best light in the constraint set by, for each light, arriving at an order p–1 polynomial for which we find the roots, which allow us to assess the error associated with that light for a given p norm. We then repeat over the N lights and choose the best light overall.

The method may ascertain the illuminant RGB which minimizes the expressions:

$$\min_j \left\{ \sum_{k=1}^{3} \sum_{i=1}^{M} \frac{|w_{jk} - I_{ik}|^p}{M} \right\}^{1/p}. \quad (8)$$

where $\omega_j$ denotes the RGB of the jth illuminant in a set, and I is the M×3 matrix of the image RGBs.

The method may solve the minimum:

$$\min_{j,\alpha} \left\{ \sum_{k=1}^{3} \sum_{i=1}^{M} \frac{|\alpha w_{jk} - I_{ik}|^p}{M} \right\}^{1/p}. \quad (9)$$

where L is a norm.

The method may comprise the subsequent step of using the estimate to remove the colour of the illuminant from image signals.

According to a second aspect of the present invention there is provided an image treatment system comprising means for carrying out the steps of the above methods.

Section 3

Preferred embodiments of the present invention will now be described, by way of example only, with reference to the accompanying drawings, of which:

FIG. 1 is a graph illustrating the ascertainment of deviations; and

Figure 2:
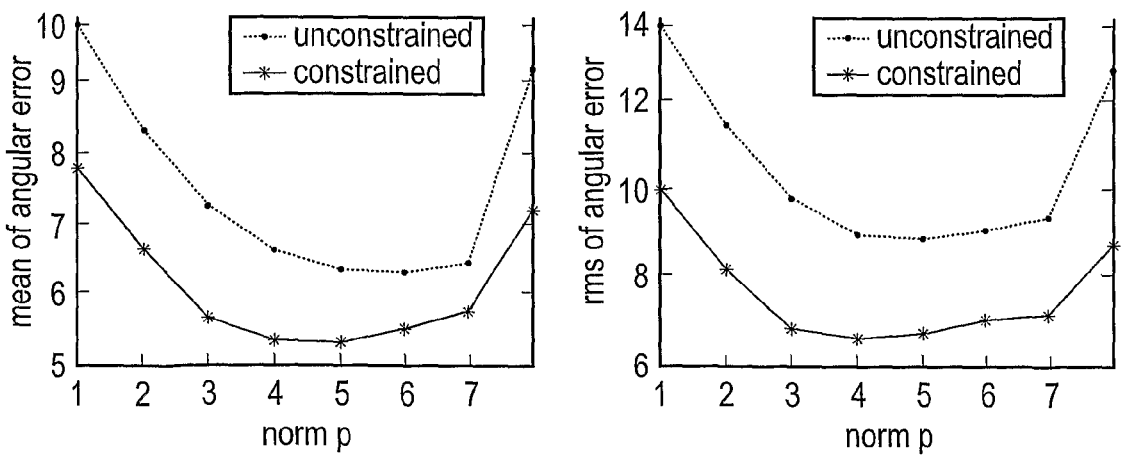

FIG. 2 showing the performances of the constrained and unconstrained p norms algorithm for the values of p from 1 to 7 and ∞; the results in terms of the mean angular error are plotted in the diagram on the left, while the rms is plotted in the right diagram.]

Let us now assume that we have a representative set of RGBs measured for different lights. Pragmatically, this could be obtained by measuring the RGB of a white surface under different lights or by just demarcating part of RGB space as being candidates for light colour. Let $\omega_j$ denote the RGB of the jth illuminant in our set and/be the M×3 matrix of image RGBs. A naive formulation of the constrained Minkowski norm approach is given below. We set out to find the illuminant RGB which minimizes:

$$\min_j \left\{ \sum_{k=1}^{3} \sum_{i=1}^{M} \frac{|w_{jk} - I_{ik}|^p}{M} \right\}^{1/p}. \quad (8)$$

This formulation is naive for two reasons. First, the illuminant colours $\omega_j$ are known up to an unknown scaling (otherwise if we estimated the light in an image that was twice as bright we would likely get the wrong answer). The way out of this problem is to simultaneously solve for a positive scalar α:

$$\min_{j,\alpha} \left\{ \sum_{k=1}^{3} \sum_{i=1}^{M} \frac{|\alpha w_{jk} - I_{ik}|^p}{M} \right\}^{1/p} \quad (9)$$

But, there is still a second problem with this modified formulation. As the illumination changes, the RGBs in an image are distorted in a non-rigid fashion and so our distance measure depends on the light. To see this, suppose I and ID denote the image RGBs under two lights where D is a 3×3 diagonal matrix effecting lighting change. Let ω and Dω denote the correct illuminant under the two lights (we assume these vectors are in our representative set of RGBs). Ideally, we would like the distance between I and ω and ID and Dω to be the same. This is not the case for the formalism so far. If this is not true it means that the error associated with the correct answer varies with illumination, even when the reflectances in a scene remain constant.

To circumvent this problem, for every illuminant $\omega=[r\ g\ b]^T$ let us define a normalized image L: $R_L=[R_1/r \ldots R_1/r \ldots R_N/r]^T$, $G_L=[G_1/g \ldots G_N/g]^T$, $B_L=[B_1/b \ldots B_N/b]^T$. It is clear that in L the estimated white point is now $\alpha[1\ 1\ 1]^T$ and the distance to the correct answer is independent of the light colour. This is the motivation for the final formalization of the constrained Minkowski norm:

$$\min_{j,\alpha} \left\{ \sum_{k=1}^{3} \sum_{i=1}^{M} \frac{|\alpha - L_{ik}^j|^p}{M} \right\}^{1/p} \quad (10)$$

To simplify matters let us stack the M red pixels on top of the M green pixels on top of the M blue pixels. Now L is a N×1 vector (N=3M). We also substitute the notation introduced in equation (7) and so we can write our minimisation as:

$$\min_{j,\alpha} \{\mu_p(\alpha - L^j)\}. \quad (11)$$

For every illuminant, as α varies with positive values, it represents the distance in the p norm sense between the point $L^j$ and each positive point of the bisector line in $R^N$. We can determine the best approximation by choosing the value α which minimizes equation (11). In the next section we will show that the problem is well posed, because equation (11) always has a unique solution: in the case of p=1, p=2, p=4 and p=∞ there is a closed form solution.

Section 4

We will find the best illuminant by finding the best α for each $L^j$ in turn and then choosing the illuminant that has the minimum error. Thus we break down our 2-dimensional minimisation into a series of 1-D minimisations (and we can do this because we have a finite number of representative lights). So, now we focus how we can solve for the optimal α for a given light $\omega_I$. As such we will drop the illuminant superscript$^I$.

Given the M values $L_I$, for every p we would like to find the minimum of the following function:

$$f(\alpha) = \left\{ \sum_{i=1}^{M} \frac{|\alpha - L_i|^p}{M} \right\}^{1/p} \quad (12)$$

Without loss of generality, let us assume the values $L_I$ are in increasing order. Now notice that if we minimize $f(\alpha)$, we also minimize the function $$g(\alpha) = \sum_{i=1}^{M} |\alpha - L_i|^p. \quad (13)$$

Let us first consider that p is even. Then g is a differentiable function whose derivative is $$g'(\alpha) = p \sum_{i=1}^{M} (\alpha - L_i)^{p-1}. \quad (14)$$

At α=0 the derivative is in negative because $g'(0)=-p\Sigma(L_I)^{p-1}$ and $L_I$ is all positive. Clearly, the derivative goes to infinity when α tends to infinity. It follows there exists at least one minimum between α equal to zero and infinity. The second derivative $$g''(\alpha) = p(p-1) \sum_{i=1}^{M} (\alpha - L_i)^{p-2} \quad (15)$$

is always positive (remember p is even) from which it follows that g' is monotonically increasing and this in turn implies g has only one minimum. This minimum must be the root of a polynomial of degree (p−1) (a root of (14)). In the case of p=2 we have $$g'(\alpha) = 2 \sum_{i=1}^{M} (\alpha - L_i) \quad (16)$$

and the zero is α=mean ($L_I$).

Reference is now made to FIG. 1, in which each v shape line represents the function $|\alpha-L_I|$. That is the absolute value of the difference of one data point and α. Thus for each $L_i$ we can find the maximum deviation. Of course we seek the minimum maximum. This is simultaneously found for $L_1$ and $L_M$ and is equal to α=½{min($L_I$)+max($L_I$)}

For p=4 we need to calculate the root of a polynomial of degree three and so can be done in closed form. In particular the polynomial is:

$$M\alpha^3 - 3\sum_{i=1}^{M}(L_i)\alpha^2 + 3\sum_{i=1}^{M}(L_i^2)\alpha - \sum_{i=1}^{M}(L_i^3) = 0. \quad (17)$$

The advantage of using a constrained p=4 norm is that the it is easier to compute than say p=6. For p=4 the constrained Minkowski calculation results in finding the roots of a degree 3 polynomial N times (where N are the number of colours of light that are in our constraint set).

For p even and larger than 4 there is no analytic closed form solution and we must search for the minima. Although relatively time-consuming, this is, however, easy to do since in all cases g has one unique minimum (we can use any gradient descent based method). Note that for p=6 the degree of the polynomial is 5 (always being p−1).

Now let us consider p is odd, then the derivative is written as:

$$g'(\alpha) = p \sum_{i=1}^{M} (|\alpha - L_i|^{p-1} \text{sgn}(\alpha - L_i)) \quad (18)$$

where sgn(x)=−1 if x<0 and sgn(x)=1 if x≧0. This is a continuous function if p is greater than 1. In the case of p=1, g'(α)=Σsgn(α−L_I) is a piecewise continuous function, not defined for α=L_I. If M is odd, then g'(α) is negative for every value of α<median (L_I) and is positive if α>median (L_I). If M=2K is even, the derivative is negative for every α<L_K, equal zero if L_K<α<L_{K+1} and positive if α>Y_{K+1}. Then in both cases α=median (L_I) is the minimum.

For other odd values of p, we can argue in a way which is analogous to the even case. It is easy to show that the first derivative has at least one zero and it is monotonically increasing and so unique. However, for p odd we must always search (even for p=3 and p=5) for the minimum. This is because the sgn function implies that the coefficients of the polynomial expressed in (18) change. Specifically for α∈2 [L_V, L_{V+1}] the coefficients are fixed. But they differ from those found in [L_{V+1}, L_{V+2}]. Nevertheless g'(α) is continuous in α and we can find the minimum by searching for it.

Finally for p=∞, we have to minimize the quantity $$g(\alpha) = \max|\alpha - L_i|. \quad (19)$$

Remembering that we are assuming L_I is monotonically increasing, it is easy to check, see FIG. 1, that the minimum is the point that satisfied $$|\alpha - L_1| = |\alpha - L_M|. \quad (20)$$

that is the value α=½{min(L_I)+max(L_I)}.

Solving the constrained Minkowski norm for p=4 is a preferred option. Not only does it deliver improved estimation performance over p=1 and p=infinity, it is extremely rapid to solve and is computationally easier than any greater than 4.

Section 5

To investigate the performance of the constrained p norm algorithm we evaluated performance using the Simon Fraser calibrated dataset, which comprises a large dataset made up of many colourful objects measured under different lights [1]. There are 32 scenes captured under 11 coloured illuminants. As our set of representative lights ω we use 87 measured illuminants which are also part of the Simon Fraser set (and which contain the 11 actually used). This set contains the true lights and is also a fairly uniform sampling (in chromaticity space) of a large number of measurements of typical real world illuminants. Details about the images, how they were collected and the illuminants measured can be found in [2]. Each image in the set is stored with the correct light RGB measurement.

We can assess a colour constancy algorithm by determining how close the estimated light colour is to the measured one. Here we compare measured and estimated light illuminants using an angular measure. Given the measured light $q_L = [R_l G_l B_l]^T$, we run the colour constancy algorithm to recover the estimated light $q_E = [R_e G_e B_e]^T$. The angular error is defined as $$\text{ang\_err} = \text{angle}(q_l, q_e) = \frac{\cos^{-1}(q_l \cdot q_e)}{|q_l| * |q_e|}. \quad (21)$$

An angular measure is used because we cannot recover the absolute intensity of the light (we cannot discriminate between a bright light illuminating a dim scene and the converse).

In the literature there are two aggregate measures used to summarise performance for the whole set: mean angular error and rms angular error. Depending on the particular paper to hand figures for either or both of these measures are presented. As far as it is possible we will report both errors. First, we were interested to compare our algorithm with the unconstrained Minkowski Norm approach. In FIG. 2 there is provided p (the norm used) against the mean angular error for the constrained and unconstrained norms. It is clear that adding an illuminant constraint significantly improves estimation performance. Note also how much better performance is (for constrained and unconstrained cases) than the grey world and max RGB answers (p=1 and p=∞).

| algorithm | Mean | RMS |
|---|---|---|
| Grey-World | | 13.8 |
| Max-RGB | | 8.9 |
| Color by Correlation | | 9.9 |
| Gamut Mappping | | 5.6 |
| Constrained 4 Norm | 5.33 | 6.57 |
| Constrained 5 Norm | 5.30 | 6.64 |
| Unconstrained 4 Norm | 6.59 | 8.94 |
| Unconstrained 6 Norm | 6.29 | 9.02 |
| CGIE | 4.9 | |

Table 1 summarises the performances for a variety of algorithms tested in term of mean and root mean square angular error degrees, comparing the results reported in [2]. The idea here is that we estimate the colour of the light and this colour is represented as an RGB coordinate. When assessing an algorithm in the lab we an measure the correct answer. Here we have an estimated light colour and the actual measured light colour (both represented as RGB vectors. The angle between these vectors in degrees is commonly used to assess performance. Ideally, we would like an algorithm to give as small an average angular error as possible.

Moreover we considered also the results obtained for the Gamut Constrained Illuminant Estimation method described in [8] and the approach presented previously by Finlayson and Trezzi in [9]. Notice that the $L^P$ unconstrained and the $L^P$ constrained algorithms were tested on the dataset of images without any kind of preprocessing. Yet Barnard et al [2] have found that preprocessing has a significant effect on performance for most estimation algorithms.

Section 6

The constrained Minowski norm approach can be used to estimate light colour in images. These images might be from digital still cameras, digital video, digitally scanned negatives. The technology is applicable to RGB cameras but also to novel imaging technologies where full spectra are recorded.

The ability to accurately estimate the colour of the light is required in order to provide acceptable photographs. It also permits one to render colours of objects stable under different coloured lights (for recognition and tracking). Normalized images so they are in standard canonical frame (and so can be used in image indexing) e.g. so that image pictures can be compared according to their colour similarity (for image database application).

The present invention provides an advantageous illuminant estimation algorithm based on a mathematical tool of the Minkowski family norm. This can be viewed as an extension of our $L^P$ approach [9] based on a simple normalisation. Incorporating only a small degree of inference, the physical knowledge of the RGB's of typical lights, we have formulated a minimisation criterion to choose the best estimated illuminant. We tested our algorithm on a set of real images and we have achieved excellent illuminant estimation results. Furthermore, because the best performance is obtained for a value of p for which the solution has a closed form, the implementation is simple and free of computational burden.

In methods according to the present invention, one can effectively find max RGB such that the RGB lies in the constraint set. Thus the max RGB algorithm has been modified in a well-defined way so that there can be a constraint on the set of lights.

References

[1] http://www.cs.sfu.ca/~colour/data/.
[2] K. Barnard, L. Martin, A. Coath, and B. V. Funt. A comparison of computational colour constancy algorithms; part two: Experiments with image data. IEEE Transactions on Image Processing, 11(9):985-996, 2002.
[3] G. Buchsbaum. A spatial processor model for object colour perception. Journal of the Franklin Institute, 310:1-26, 1980.
[4] V. Cardei B. V. Funt and K. Barnard. Learning colour constancy. In 4th IS&T and SID Colour Imaging Conference. 1996.
[5] G. D. Finlayson. Colour in perspective. IEEE transactions on Pattern analysis and Machine Intelligence, pages 1034-1038, October 1996.
[6] G. D. Finlayson, B. V. Funt, and K. Barnard. Colour constancy under varying illumination. In Proceedings of the fifth International Conference on Computer Vision, pages 720-725. IEEE Computer Society, June 1995.
[7] G. D. Finlayson, S. D. Hordley, and P. M. Hubel. Colour by correlation: a simple unifying theory of colour constancy. In IEEE international conference on computer vision, pages 835-842, 1999.
[8] G. D. Finlayson, S. D. Hordley, and I. Tastl. Gamut constrained illuminant estimation. Proceedings of the 9th International Conference on Computer Vision, 2, October 2003.
[9] G. D. Finlayson and E. Trezzi. Shade of grey and colour constancy. In IS&T and SID's 12th Colour Imaging Conference, pages 37-41, 2004.
[10] David A. Forsyth. A novel algorithm for colour constancy. International Journal of Computer Vision, 5:5-36, 1994.
[11] B. V. Funt, K. Barnard, and L. Martin. Is machine colour constancy good enough. In The Fifth European Conference on Computer Vision (Vol II), pages 445-459. European Vision Society, 1998.
[12] P. M. Hubel, G. D. Finlayson, J. Holm, and M. S. Drew. Matrix calculations for digital photography. In IS&T and SID's 5th Colour Imaging Conference, pages 105-111. 1997.
[13] A. N. Kolmogorov and S. V. Fomin. Introductory real analysis. Dover Publications, 1975.
[14] E. H. Land. The retinex theory of colour vision. Scientific American, pages 108-129, 1977.
[15] L. T. Maloney and B. A. Wandell. Colour constancy: a method for recovering surface spectral reflectance. J. Opt. Soc. Am. A, 3:29-33, 1986.
[16] B. Schiele and A. Waibel. Gaze tracking based on face colour. In International Workshop on Automatic Face- and Gesture-Recognition, June 1995.

The invention claimed is:

1. A method comprising:
receiving, at a computer system, a digital image comprising image values "I" corresponding to a plurality of pixels, where each image value $I_j$ comprises [red ($R_j$), green ($G_j$), blue ($B_j$)]$^T$ associated with a corresponding pixel "j" of the plurality of pixels, j=1 . . . M, the digital image having a colour bias due to illumination conditions when the digital image was acquired, the colour bias representing an illuminant "w" of the digital image;
accessing by the computer system, a plurality of predetermined illuminants $w_k$=[$R_k$, $G_k$, $B_k$]$^T$, k=2, 3, . . . on a storage device associated with the computer system, each of the accessed plurality of predetermined illuminants $w_k$ being associated with a corresponding one of predefined illumination conditions;
for each predetermined illuminant $w_k$ of the accessed plurality of predetermined illuminants, estimating, by the computer system, a p-norm distance $X_k$ between the predetermined illuminant $w_k$ and the image values "I" of the received digital image, where the p-norm is a constrained Minkowski norm having a finite p that is larger than 1, $$X_k = \left\{ \sum_{t=1}^{B} \sum_{f=1}^{M} \frac{|W_{kt} - L_{ft}|^p}{M} \right\}^{1/p};$$

selecting, by the computer system, a predetermined illuminant $w_0$ from among the accessed plurality of predetermined illuminants that corresponds to the smallest p-norm distance $X_0$ from among the plurality of estimated p-norm distances, $$X_0 = \min_{k} X_k = \left\{ \sum_{t=1}^{B} \sum_{f=1}^{M} \frac{|W_{0t} - L_{ft}|^p}{M} \right\}^{1/p};$$

and
assigning, by the computer system, the selected predetermined illuminant $w_0$ as the illuminant associated with the received digital image, w:=$w_0$.

2. The method according to claim 1, wherein the estimating the p-norm distance $X_k$ between the predetermined illuminant $w_k$ and the image values "I" of the received digital image comprises:
for each redetermined illuminant $w_k$ of the accessed plurality of predetermined illuminants,
normalizing, by the computer system, the image values "I" of the received digital image using the predetermined illuminant wk=[rk, gk, bk] to obtain a normalized instance of the image values "L" of the received digital image corresponding to the predetermined illuminant wk, where $L^{(k)}$:=[$R_1/r_k$, $R_2/r_k$, . . . , $R_M/r_k$], [$G_1/g_k$, $G_2/g_k$, . . . , $G_M/g_k$], [$B_1/b_k$, $B_2/b_k$, . . . , $B_M/b_k$],
determining, by the computer system, a constraint a constraint $\alpha_k$ that minimizes a p-norm distance $X_k(\alpha)$ between the constraint $\alpha_k$ and the normalized instance of the image values $L^{(k)}$ of the received digital image corresponding to the predetermined illuminant $w_k$, $$\min_{\alpha} X_k(\alpha) = \min_{\alpha} \left\{ \sum_{t=1}^{B} \sum_{f=1}^{M} \frac{\|\alpha - L_{ft}^{(k)}\|^p}{M} \right\}^{1/p},$$

and
assigning, by the computer system, the minimum p-norm distance $X_k(\alpha_k)$ between the determined constraint $\alpha_k$ and the normalized instance of the image values $L^{(k)}$ of the received digital image that correspond to the predetermined illuminant $w_k$ as the estimated the p-norm distance $X_k$ between the predetermined illuminant $w_k$ and the image values "I" of the received digital image, $$X_k := X_k(\alpha_k) = \min_\alpha X_k(\alpha).$$

3. The method according to claim 1, wherein p is even and is less than or equal to 8.

4. The method according to claim 3, wherein p is 4.

5. The method according to claim 1, wherein p is odd and is less than or equal to 7.

6. The method according to claim 1, further comprising removing the assigned illuminant $w_0$ from the image values "I" of the received digital image to obtain a treated instance of the received digital image, where a colour of the treated instance of the received digital image cues reflectance of the received digital image; and
using a colour-based tracker to track an object depicted in the treated instance of the received digital image, or
using a colour recognition system to recognize an object depicted in the treated instance of the received digital image.

7. An image treatment system comprising:
one or more processors;
a storage system communicatively coupled with the one or more processors and storing a plurality of predetermined illuminants, each of the plurality of predetermined illuminants being associated with a corresponding one of predefined illumination conditions; and
non-transitory computer storage medium encoding instructions that when executed by the one or more processors cause the one or more processors to perform operations comprising:
 receiving a digital image comprising image values, the received digital image having a colour bias due to illumination conditions when the received digital image was acquired, the colour bias representing an illuminant of the received digital image;
 for each predetermined illuminant of the stored plurality of predetermined illuminants,
  normalizing the image values of the received digital image using the predetermined illuminant to obtain a normalized instance of the image values of the received digital image corresponding to the predetermined illuminant,
  obtaining a constraint that minimizes a distance in p-norm sense between the constraint and the normalized instance of the image values of the received digital image corresponding to the predetermined illuminant, where the p-norm is a Minkowski norm having a p that is larger than 1 and is finite, and
  determining the minimum p-norm distance between the obtained constraint and the normalized instance of the image values of the received digital image corresponding to the predetermined illuminant;
 identifying one of the plurality of normalized instances of the image values of the received digital image that corresponds to the smallest from among the determined minimum p-norm distances;
 assigning the one from among the stored plurality of predetermined illuminants that was used to normalize the identified one of the plurality of normalized instances of the received image as the illuminant associated with the received digital image; and
 removing the assigned one from among the stored plurality of illuminants from the received digital image.

8. The image treatment system according to claim 7, wherein p is even and is less than or equal to 8.

9. The image treatment system according to claim 7, wherein p is odd and is less than or equal to 7.

10. The image treatment system according to claim 7, wherein the operation of obtaining the constraint that minimizes the distance in p-norm sense between the obtained constraint and the normalized instance of the received digital image corresponding to the predetermined illuminant comprises:
finding a root of the p-norm distance.

11. The image treatment system according to claim 7, wherein the operation of obtaining the constraint that minimizes the distance in p-norm sense between the obtained constraint and the normalized instance of the received digital image corresponding to the predetermined illuminant comprises:
minimizing the p-norm distance using a gradient descent algorithm, such that the determined minimum p-norm distance between the constraint obtained using the gradient descend algorithm and the normalized instance of the received digital image corresponding to the predetermined illuminant represents a global minimum.

12. The image treatment system according to claim 7, wherein the operations comprise preprocessing the received digital image prior to the operations of normalizing.

13. A non-transitory computer readable medium encoding instructions that when executed by data processor cause the data processor to perform instructions comprising:
accessing a digital image comprising image values corresponding to a plurality of pixels, where each image value comprises red (R), green (G) and blue (B) associated with a corresponding pixel of the plurality of pixels, the digital image having a colour bias due to illumination conditions when the digital image was acquired, the colour bias representing an RGB illuminant of the digital image;
accessing a plurality of predefined RGB illuminants, each of the plurality of predefined RGB illuminants being associated with a corresponding one of predefined illumination conditions;
for each predefined RGB illuminant of the plurality of predefined RGB illuminants, estimating a p-norm distance between the predefined RGB illuminant and the image values of the digital image, where the p-norm is a constrained Minkowski norm having a finite p that is larger than 1;
selecting a predefined RGB illuminant from among the plurality of predefined RGB illuminants that corresponds to the smallest p-norm distance from among the plurality of estimated p-norm distances; and
assigning the selected predefined RGB illuminant as the RGB illuminant of the digital image.

14. The non-transitory computer readable medium according to claim 13, wherein p is even and is less than or equal to 8.

15. The non-transitory computer readable medium according to claim 14, wherein p is 4.

16. The non-transitory computer readable medium according to claim 13, wherein p is odd and is less than or equal to 7.

17. The non-transitory computer readable medium according to claim 13, wherein the operations further comprise:

removing the assigned illuminant from the image values of the digital image to obtain treated image values of the digital image, where the treated image values of the digital image cue reflectance of the digital image; and subsequently, using a colour-based tracker to track an object depicted in the digital image.

18. The non-transitory computer readable medium according to claim 13, wherein the operations further comprise:

removing the assigned illuminant from the image values of the digital image to obtain treated image values of the digital image, where the treated image values of the digital image cue reflectance of the digital image; and subsequently, using a colour recognition system to recognize an object depicted in the digital image.

19. The non-transitory computer readable medium according to claim 13, wherein the operation of estimating the p-norm distance between the predefined RGB illuminant and the image values of the digital image comprises:

for each predefined RGB illuminant of the plurality of predefined RGB illuminants, normalizing the image values of the digital image using the predefined RGB illuminant to obtain a normalized instance of the image values of the digital image corresponding to the predefined RGB illuminant, determining a constraint that minimizes a p-norm distance between the constraint and the normalized instance of the image values of the digital image corresponding to the predefined RGB illuminant, and assigning the minimum p-norm distance between the determined constraint and the normalized instance of the image values of the digital image corresponding to the predefined RGB illuminant as the estimated p-norm distance between the predefined illuminant and the image values of the digital image.

20. The non-transitory computer readable medium according to claim 19, wherein the operation of determining the constraint that minimizes the p-norm distance between the constraint and the normalized instance of the image values of the digital image corresponding to the predefined RGB illuminant comprises:

minimizing the p-norm distance using a gradient descent algorithm, such that the minimum p-norm distance between the constraint determined using the gradient descend algorithm and the normalized instance of the image values of the digital image corresponding to the predefined RGB illuminant represents a global minimum.

* * * * *